United States Patent [19]
James

[11] 3,797,621
[45] Mar. 19, 1974

[54] SLIP CLUTCH
[75] Inventor: Randall V. James, Watertown, N.Y.
[73] Assignee: The Scott & Fetzer Company, Lakewood, Ohio
[22] Filed: Nov. 17, 1972
[21] Appl. No.: 307,467

[52] U.S. Cl. .................................. 192/56, 64/29
[51] Int. Cl. ............................................. F16d 7/02
[58] Field of Search ........... 192/56 R; 64/29, 30 E, 64/27 B, 27 L

[56] References Cited
UNITED STATES PATENTS
| 2,140,255 | 12/1938 | Reiske ................................ 64/29 |
| 2,802,254 | 8/1957 | Bohnhoff et al. ...................... 64/29 |
| 2,969,133 | 1/1961 | Langheck .......................... 192/56 R |
| 3,185,275 | 5/1965 | Orwin ............................... 192/56 R |
| 3,228,209 | 1/1966 | Hersey ............................. 192/56 R |

Primary Examiner—Benjamin W. Wyche
Assistant Examiner—Wesley S. Ratliff, Jr.
Attorney, Agent, or Firm—McNenny, Farrington, Pearne & Gordon

[57] ABSTRACT

In a torque-limiting slip clutch, spring discs engage opposite sides of a gear wheel web and are keyed to a shaft for the wheel. Spaced protuberances are struck into the rims of the spring discs and engage slots formed in the wheel web. The central portions of the spring discs are clamped against the wheel and the rim portions are free of clamping.

3 Claims, 3 Drawing Figures

3,797,621

SLIP CLUTCH

FIELD OF THE INVENTION

This invention relates to torque-limiting slip clutches and more particularly to slip clutches adapted to be compactly included in power transmission gear trains.

DESCRIPTION OF THE PRIOR ART

Examples of prior art slip clutches are found in U.S. Pat. Nos. 2,969,133 to Langheck and 3,228,209 to Hersey. The latter includes disc-like clutch elements stamped from spring steel. The former illustrates a slip clutch connection between a pulley wheel and the shaft on which the wheel is mounted. Note that the clutch structure extends considerably beyond the cross-sectional profile of the wheel itself.

SUMMARY OF THE INVENTION

This invention is useful to protect a power transmission gear train by avoiding overloading and breaking of members of the gear train. Shock loads of high magnitude are relieved by slippage, yet a positive drive without slippage is provided up to the stall point of a drive motor, as for example in an industrial floor polishing machine. Spring loading and shock load reactive forces at each side of the clutch counteract each other at all times, including during power transmission, during slippage, and during transients between these conditions. The clutch arrangement is very compact, adding little or nothing to the space requirements for an unprotected gear train.

DESCRIPTION OF THE ILLUSTRATED EMBODIMENT

Figure 1:
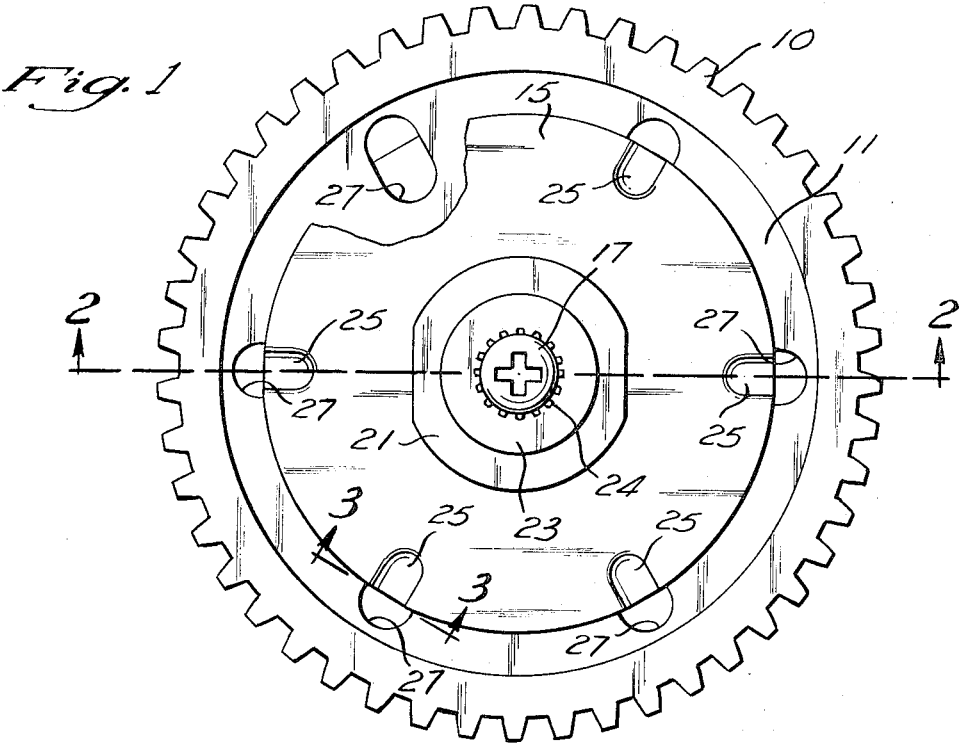
FIG. 1 is a plan view of an embodiment of the invention.

A gear wheel 10 has a web 11 which carries the outer portion of the wheel and which in turn is supported on the shaft 12 which extends through the web.

Discs 15 of spring-steel are positioned against opposite sides of the web 11 and are keyed to the shaft 12. The spring discs 15 are clamped between a screw 17 and a shoulder 19 on the shaft 12. Suitable washers 21 and an end washer 23 and lock washer 24 may be provided to aid in applying and maintaining the clamping of the spring discs.

The direct clamping of the spring discs is in the vicinity of the shaft 12, and the spring discs are free of such direct clamping at their outer portions that are radially spaced from the shaft.

A plurality of spaced protuberances 25 are struck into the spring discs 15. As viewed in FIG. 1 the protuberances 25 appear as depressions since they are seen from their rearward side. The protuberances are received in a plurality of correspondingly spaced annularly distributed slots 27 formed in the wheel web.

The gear wheel 10 may form part of the gear train (not shown) for an electrically driven floor polisher or the like, and the shaft 12 may function as the drive spindle of a polishing, scrubbing, or waxing head or the like mounted below the housing (not shown) for the gear train.

Although the invention may be used with metal wheels, it is particularly appropriate for plastic gear wheels and in general for any application where gear failures may be caused by the sudden application of shock loads of high magnitude. In one application, the gear wheel was a type 6/6 nylon containing molybdenum disulfide ("Nylatron GS" supplied by Polymer Corporation).

The invention is appropriate to providing a positive drive without slipping up to the stall point of a drive motor, while still providing the ability to absorb high overloads by slipping. For gear wheels which are subject to breakage, a particular advantage of the invention is the sharing of driving forces between the spring discs 15 on either side of the gear, and the arrangement whereby all spring loading of the discs against the gear is counteracted by opposed spring loading during normal operation of the device, during slippage, and during transcience between normal operating and slippage. Under all of these conditions, there is no completely unbalanced loading of the gear from one side, and significant bending loads are minimized or eliminated even under shock loading conditions.

The protuberances 25 coacting with the slots 27 constitute torque-transmitting detent means between each of the discs 15 and each side of the wheel web 11. These detent means are located at outer portions of the discs 15. As torque increases, these detent means react increasingly against the spring biases of the spring discs 15, but the reacting of the detent means at one side of the wheel counteracts the reacting of the detent means at the other side of the wheel at all times so that bending loads on the wheel are minimized or eliminated. When the reacting on each side is sufficient to lift the protrusions 25 from the slots 27 against the bias of the spring discs 15, slippage occurs, but at all times including the transistion from the non-slipping to the slipping condition the reaction loads imposed by the detent means are balanced on both sides of the wheel.

Thus, during normal operation, torque is transmitted from the gear 10 and web 11 through the spring discs 15 and then to the shaft 12 to which the spring discs are keyed. When a sudden and severe overload is applied, the sides of the protrusions 25 ride up on the sides of the slots 27 to thereby force the radially outer portions of the discs 15 to deflect away from the gear wheel web 11. Contact is always maintained between the center portions of the spring discs 15 and the web 11, and deflection of the discs starts from this vicinity. Slippage between the gear web 11 and the spring discs 15 then occurs, sliding contact occurring at the center portions of the assembly, and the spring discs 15 being out of contact with the web 11 at radially outer portions of the assembly except for the sliding contact of the protrusions 25 with the web 11 as they slip between the slots 27.

The sliding will continue to occur only so long as the overload is sufficient to carry the protrusions 25 across succeeding sets of slots 27. As soon as the overloading is discontinued, the protrusions 25 will no longer cross the slots 27 but will re-engage to re-establish the positive drive.

Figure 2:
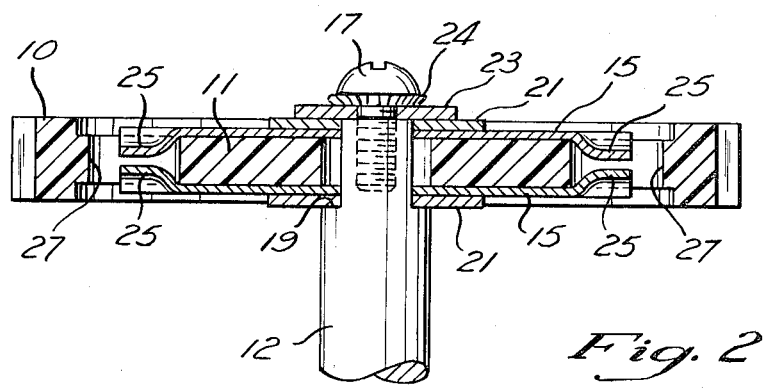
FIG. 2 is a section taken on the diametric plane of line 2—2 in FIG. 1.
Figure 3:
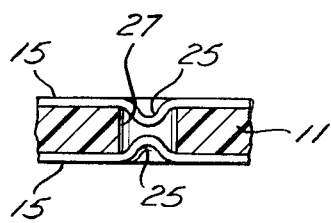
FIG. 3 is a fragmentary section taken on the plane of line 3—3 in FIG. 1.

It is to be observed that the slip clutch arrangement of the invention is compact, and in fact a gear train including one or more such clutches requires little or no more space than a gear train without any protection against shock loads. Indeed, as seen in FIG. 2 in the illustrated embodiment, the spring discs 15 are positioned entirely within the diametric cross-sectional profile 29 of the gear wheel 10.

The limit on torque transmitted by the clutch plates is affected by the following factors:
1. Distance from clutch center to protuberances.
2. Number of protuberances.
3. Clutch plate material thickness.
4. Side profile shape of protuberances.
5. Height of protuberances.
6. Shape of mating slots in gear.
7. Coefficient of friction between clutch plate and gear material.
8. Amount of preload or relief applied to clutch plate, that is, degree of concavity or convexity before assembly.

The scope of the invention is not restricted to the specific details of the illustrated embodiment, but is defined by the following claims.

What is claimed is:

1. A compact torque-transmitting gear wheel and wheel shaft subassembly embodying a slip clutch and having a capability of (1) torque-limiting temporary release under sufficiently high torque and (2) positive drive when engaged or self-re-engaged at lower torques, with clutch-engaging spring forces against the wheel being maintained in opposed balanced condition at all times, comprising a wheel, a shaft extending through the web of the wheel and carrying the wheel, spring discs keyed to the shaft and directly clamped, in the vicinity of the shaft, against the web of the wheel on opposite sides of said web and being free of such direct clamping at portions of the discs that are radially spaced from the shaft, a plurality of spaced protuberances struck into the spring discs and annularly distributed around the discs at a radial distance from the shaft, said protuberances being received in a plurality of corresponding spaced annularly distributed slots in the wheel web, the driving forces transmitted between the gear and the keyed-together spring discs being shared on both sides of the gear and all spring loading of the discs against the gear being counteracted by other spring loading during normal operation, during slippage, and during transients between normal operation and slippage.

2. A device as in claim 1 in which the spring discs are positioned entirely within the diametric cross-sectional profile of the gear wheel.

3. A compact torque-transmitting wheel and wheel shaft subassembly embodying a slip clutch, said subassembly comprising a wheel, a shaft carrying the wheel, spring discs fixed for rotation with the shaft and directly clamped, in the vicinity of the shaft, against opposite sides of the wheel, and being free of such clamping at radially outward portions of the discs, torque-transmitting detent means between each of the discs and each side of the wheel at outer portions of the discs, said detent means reacting increasingly against the spring biases of said spring discs with increasing torque to a point where said detent means release to allow slippage, the reacting of the detent means at one side of the wheel counteracting the reacting of the detent means at the other side of the wheel at all times whereby bending loads on the wheel due to the reacting of the detent means are minimized or eliminated.

* * * * *